United States Patent
Maass et al.

(10) Patent No.: US 7,490,438 B1
(45) Date of Patent: Feb. 17, 2009

(54) MOTOR VEHICLE DOOR

(75) Inventors: Klaus-Peter Maass, Frankfurt (DE); Uwe Bergmann, Niederdorfelden (DE); Arnd G. Herwig, Baunach (DE); Stefan Jutzi, Braunschweig (DE); Patrice Cardine, Sully-sur-Loire (FR); Rainer Grimm, Frankfurt (DE); Harald Kollner, Altenstadt (DE); Klaus-Dieter Strauss, Braunschweig (DE); Georg Wurm, Bad Homburg (DE); Daniel Drewniok, Frankfurt (DE); Patrick Hof, Marburg (DE); Simon Blair Dobson, Folkestone (GB); Gregory Keyes, Birmingham (GB); Kenneth W. Schang, Plymouth, MI (US)

(73) Assignee: Meritor Automotive GmbH, Frankfurt (DE)

( * ) Notice: Subject to any disclaimer, the term of this patent is extended or adjusted under 35 U.S.C. 154(b) by 1958 days.

(21) Appl. No.: 09/672,393

(22) Filed: Sep. 28, 2000 (Under 37 CFR 1.47)

(30) Foreign Application Priority Data

| Sep. 28, 1999 | (DE) | ................................. 199 46 307 |
| Apr. 12, 2000 | (DE) | ............................. 200 06 773 U |
| May 29, 2000 | (DE) | ............................. 200 09 435 U |

(51) Int. Cl.
  *B60J 5/04* (2006.01)
(52) U.S. Cl. .......................................... 49/502; 49/352
(58) Field of Classification Search .................. 49/502, 49/348, 349, 350, 351, 352; 296/146.5, 146.7
See application file for complete search history.

(56) References Cited

U.S. PATENT DOCUMENTS

| 5,062,240 | A  | * | 11/1991 | Brusasco ....................... 49/348 |
| 5,581,952 | A  | * | 12/1996 | Kapes et al. ................... 49/502 |
| 5,906,072 | A  | * | 5/1999  | Feige et al. .................... 49/502 |
| 6,076,882 | A  | * | 6/2000  | Szerdahelyi et al. ...... 296/146.1 |
| 6,226,927 | B1 | * | 5/2001  | Bertolini et al. ............... 49/502 |
| 6,233,875 | B1 | * | 5/2001  | Carlo et al. .................... 49/502 |
| 6,305,129 | B1 | * | 10/2001 | Eckhardt et al. .............. 49/502 |
| 2001/0038228 | A1 | * | 11/2001 | Morrison et al. ......... 296/146.5 |

FOREIGN PATENT DOCUMENTS

DE 199 46 307 4/2001

OTHER PUBLICATIONS

German Utility Model 200 06 773.7 filed Apr. 12, 2000.

* cited by examiner

*Primary Examiner*—Jerry Redman
(74) *Attorney, Agent, or Firm*—Carlson, Gaskey & Olds

(57) ABSTRACT

The invention relates to a motor vehicle door, consisting of an interior sheet metal and an exterior sheeting, together which form a hollow interior space of the door, having an opening in the interior sheet metal and having a carrier module that closes said opening, and carries at least one functional part of the motor vehicle door, such as a hinge part, lock part or window lifter part. In order to simplify the assembly of a motor vehicle door it is proposed that the vehicle door (10) features, apart from the opening (18) in the interior sheet metal (12) which may be closed by means of a carrier module, an additional access opening (22) adequately large for inserting the carrier module, including the at least one functional part, into the interior space (16) of the door and that the carrier module consists of a base plate (20) which closes the opening (18) of the interior sheet metal (12) from the side of the hollow interior space (16) of the door.

16 Claims, 6 Drawing Sheets

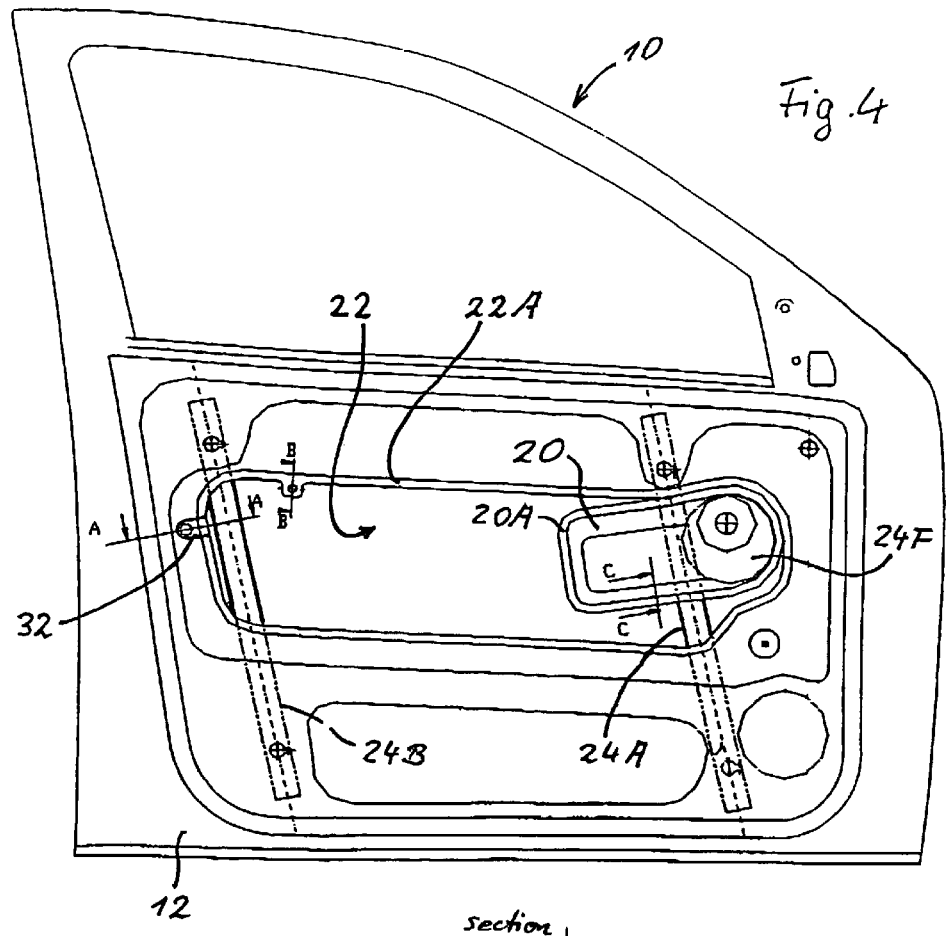
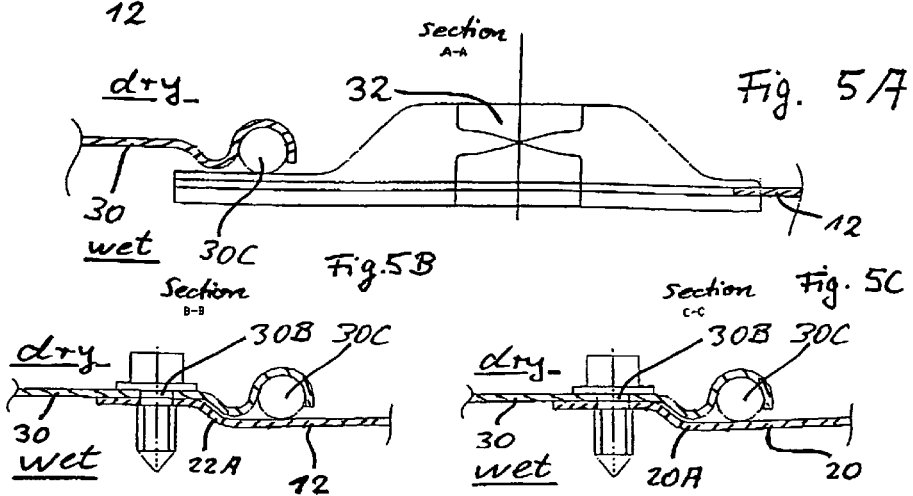

MOTOR VEHICLE DOOR

BACKGROUND OF THE INVENTION

The invention relates to a motor vehicle door consisting of an interior sheet metal and an exterior sheeting, together which form a hollow interior space of the door, and having an opening in the interior sheet metal and having a carrier module to close said opening that carries at least one functional part of the motor vehicle door, such as a hinge part, lock part or window lift part.

In known motor vehicle doors of this type, one strives to create, in the interior sheet metal, one single opening having a large area in order to be able to "thread" the functional part of the motor vehicle door, already mounted to a carrier module, from outside the interior sheet metal into said opening. In this connection, a carrier module consists of a cover-like component, the circumferential sealing edge of which is placed on the corresponding sealing edge of the opening in the interior sheet metal, from outside the hollow space, and is connected to the latter. This leaves the interior space of the door largely closed and sealed toward the vehicle interior. Despite the combining of several functional parts on the carrier module and the consequent possibility of preassembly connected therewith, the assembly process of a motor vehicle door remains, as a whole, complicated and time-consuming. For one thing, electrical and mechanical connections must be created between the motor vehicle door and functional parts. Secondly, functional tests and adjusting work are required. In the end, the last two tasks are meaningful only for a carrier module that has already been securely fastened to the interior sheet metal of the door. But this also signifies that the interior space of the door already is closed and the interior space of the door, should the need arise, is accessible only through a few additional openings having, however, very small dimensions in cross section.

SUMMARY OF THE INVENTION

Starting from here, the underlying object of the invention is to simplify the assembly of a motor vehicle door of this generic class. According to this, a motor vehicle door comprises, apart from an opening in the interior sheet metal which may be closed by means of the carrier module, an additional access opening adequately large for insertion of the carrier module, including the at least one functional part, into the interior space of the door and the carrier module consists of a base plate which closes the opening of the interior sheet metal from the side of the hollow interior space of the door.

This makes it possible, first, to insert a carrier module into the interior space of the door and, not until later, to close a comparatively large access opening to the interior space of the door. Therefore, it is very simple to realize the mechanical and electrical connecting of all functional parts to the motor vehicle door, since installation of the carrier module does not result in a simultaneous closing of the interior space of the door. An adequate accessibility to the interior space of the door is created as a consequence. Functional tests now may be carried out with a finished mounted carrier module, as can adjusting work. The adequately large access opening to the interior space of the door is not closed from the outside until the end, with a component featuring no functional parts, or functional parts that impede assembly to a lesser degree.

An adequately large access opening may be closed in different ways. First, it is possible to place the exterior sheeting of a motor vehicle door which, if necessary, may feature a frame that stiffens and carries the exterior sheeting, from the outside onto the so-called "interior sheet metal" in a way creating a seal, as described in German Patent Application Number 199 46 307 of German Utility Model 200 06 773.7; reference is made to the full contents of both by claiming the inner priority. Alternatively, it is possible to provide a special closing plate for the so-called interior sheet metal.

With only a comparatively small cutout, or opening, closed by means of the base plate, then, the carrier module featured with the use of the exterior sheeting as the closing element for the adequately large access opening in the interior sheet metal, a known large opening is provided in the interior sheet metal of the motor vehicle door with the use of a closing plate. In this connection, the base plate of the carrier module, likewise, claims only a comparatively smaller area so that after assembly of the carrier module around the base plate, an adequately large access opening to the hollow interior space of the door remains open. This area of the interior sheet metal of the door remaining open is subsequently closed in a sealing manner by means of the closing plate. Therefore, the closing plate essentially has a sealing function. In this case, the carrier module may be arranged both at the edge of an adequately large access opening and also at any optional location in the middle of an adequately large access opening. In the first case, the closing plate features a cut-out at the edge and, in the second case, an opening. The closing plate consequently represents a part of the so-called "interior sheet metal" of a motor vehicle door, which, nonetheless, is not mounted until later.

Insofar as the terms "interior sheet metal" and "exterior sheeting" are used for the purposes of this invention, no definite planar material has been established. Plastic and other materials, particularly flat materials, come into consideration for this purpose apart from the conventional use of metal plates.

Therefore, the term "interior sheet metal" corresponds merely to conventional linguistic usage for a planar component forming the hollow interior space of the door on the interior side of a motor vehicle.

It is preferred for at least part of a door window lifter, as the window lifter motor, the window lifter winch, the window lifter guiding rails, the window pane as well as a door inside handle, a door lock, a door lock housing, a cable tree, a loudspeaker or the like, to come into consideration as the at least one functional part carried by a carrier module, namely the base plate. More specifically, it is especially preferred, in this connection, to permanently connect to the base plate at least one guide rail of a window pane that may be lifted and lowered.

A particularly important function of the carrier module consists in the fact that the base plate is provided between the window lifting driver and window lifting driven component and a separation is produced between the dry side on the interior side of the motor vehicle and the back, wet side on the side of the interior space of the door. The hollow interior space of the door, namely, may not be closed in a way fully sealing against moisture because of, among other things, the passage gap for the window pane in the sill region of the door. Then, for example, a hoisting winch is arranged on the wet side of the base plate and an electric window lifting motor is arranged on the dry side. Both may be connected to each other in a driving sense through the base plate by means of a sealed rotary transmission leadthrough.

A new type of motor vehicle window lifter is realized by means of the fact that the two guide rails for a window pane that may be lifted and lowered are connected to each other in a rigid sense, preferably by means of rigid braces. This does away with adjusting processes, both in order to adjust the parallelism as well as in order to fine-tune the tension of cables. Bowden cables used earlier may be, however do not have to be, done away with completely, since the, heretofore necessary, flexibility between the two guide rails has been eliminated. Therefore it is possible to pre-assemble a window lifter in all details and to manufacture same connected to a base plate and even to test for function and to incorporate said unit in the interior space of the door, even with the window pane already inserted if desired. A new type of window lifter of this type, which, more specifically, may feature a diecast part as the carrier structure, also may carry additional functional elements, such as door lock holder so that less components need be maneuvered individually to their place of installation.

The aforementioned as well as claimed components described in the embodiments and to be used according to the invention are not subject to any particular exceptional circumstances with respect to their size, design, material selection and technical conception, such that known selection criteria may find unlimited use in the field of application.

Additional details, features and advantages of the object of the invention may be deduced from the subordinate claims and also from the following description of the associated drawing representing, per example, a preferred embodiment of a motor vehicle door according to the invention.

BRIEF DESCRIPTION OF THE DRAWINGS

FIG. 4 shows, from an alternative motor vehicle door with a base plate but without a closing plate, a side view of the interior sheet metal, viewed from the side of the vehicle interior;

FIG. 5A shows, from the same motor vehicle door, however, with a closing plate, a section along Line A-A according to FIG. 4;

FIG. 5B shows from the same motor vehicle door, however, with a closing plate, a section along Line B-B according to FIG. 4;

FIG. 5C shows from the same motor vehicle door, however, with a closing plate, a section along Line C-C according to FIG 4;

FIG. 7A shows, form a base plate with a window lifter of a motor vehicle door according to FIG. 4, a side view, as well as;

DETAILED DESCRIPTION OF THE PREFERRED EMBODIMENT

Figure 1:
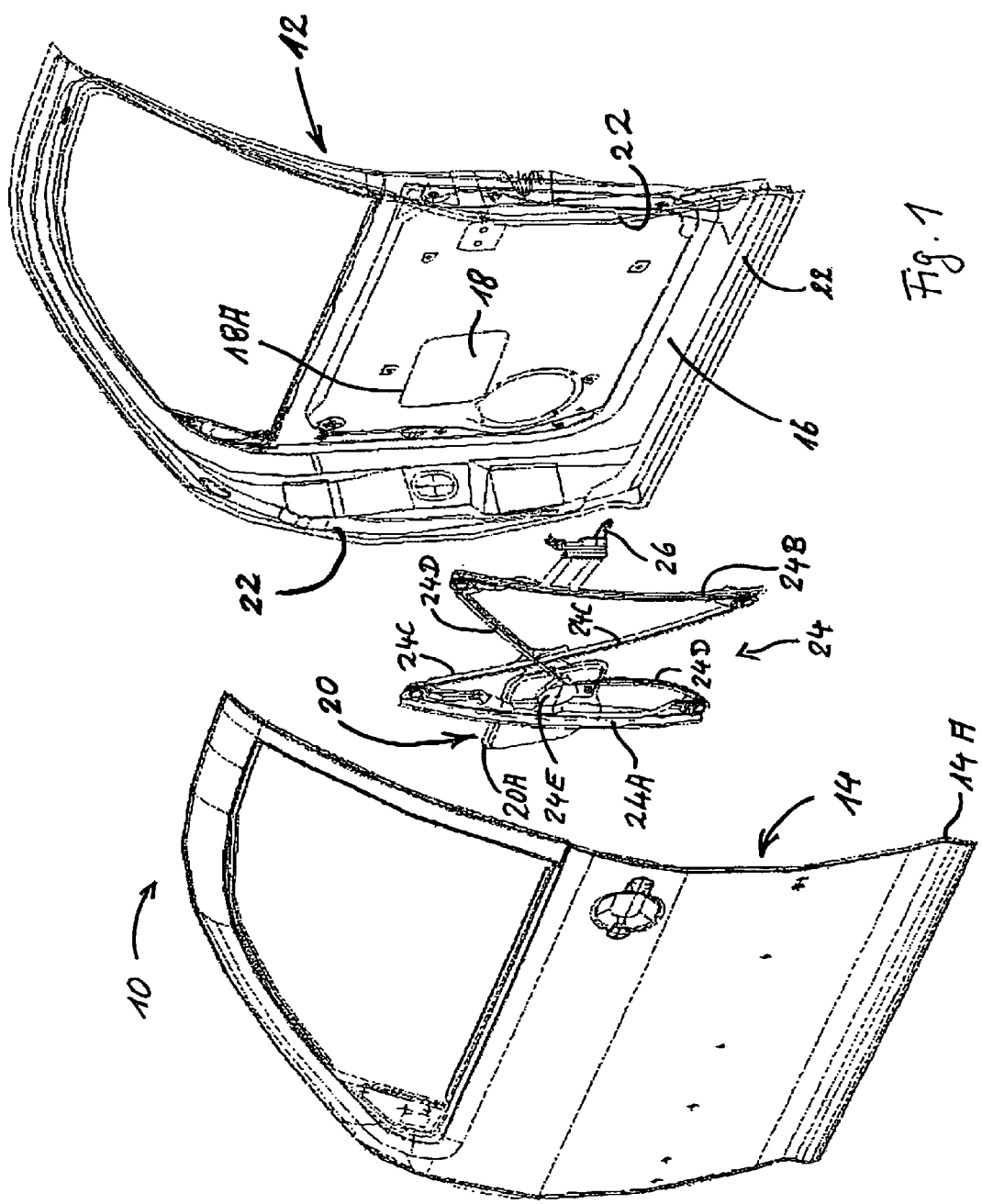
FIG. 1 shows a motor vehicle door in a perspective exploded view.

As is evident form FIG. 1, a motor vehicle door, characterized as a whole as 10, consists of an interior sheet metal 12, manufactured by means of deep-drawing and/or stamping, and an exterior sheeting 14, which in a combined state form a hollow interior space of the door 16. The interior sheet metal 12 of the door features an opening 18, which may be closed from the side of the interior space of the door by means of a base plate 20 serving as a carrier module. In this embodiment, the exterior sheeting 14 serves as the closing element for an adequately large access opening 22, formed at the free edge of the essentially pot-shaped or tub-shaped interior sheet metal, which access opening permits insertion of the carrier module including at least one functional part and possibly the window pane into the interior space 16 of the door. The exterior sheeting 14 is provided with a circumferential carrier frame or stiffening frame 14A on the side facing the hollow interior space 16 of the door. The window pane 28 and the base plate 20 are adjustable relatively to each other.

In the embodiment represented and, in this respect, preferred, the functional part of the motor vehicle door carried by the base plate 20 consists of a window lifting arrangement 24 and also a lock holder 26 for a door lock connected to the window lifting arrangement in a way permitting movement.

The window lifting arrangement 24 consists of parallel guide rails 24A, 24B, rigid connecting braces 24C, 24D and a motional drive consisting of a cable winch 24E and electric motor 24F. Details of said window lifting arrangement connected to the base plate are explained more closely in connection with FIGS. 2 and 3.

Figure 2:
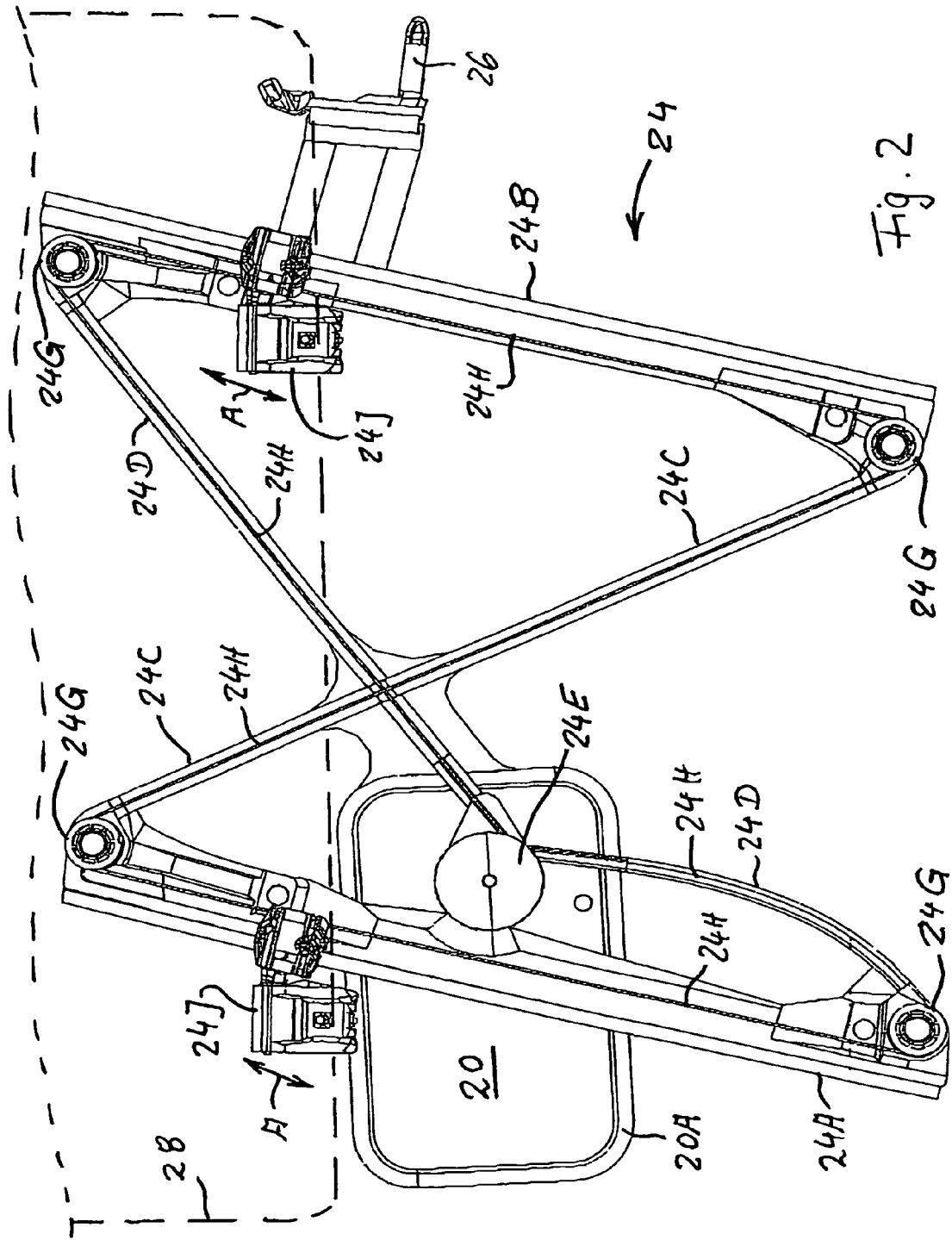
FIG. 2 shows, from the motor vehicle door according to FIG. 1, a side view of the carrier module with complete window lifter.
Figure 3:
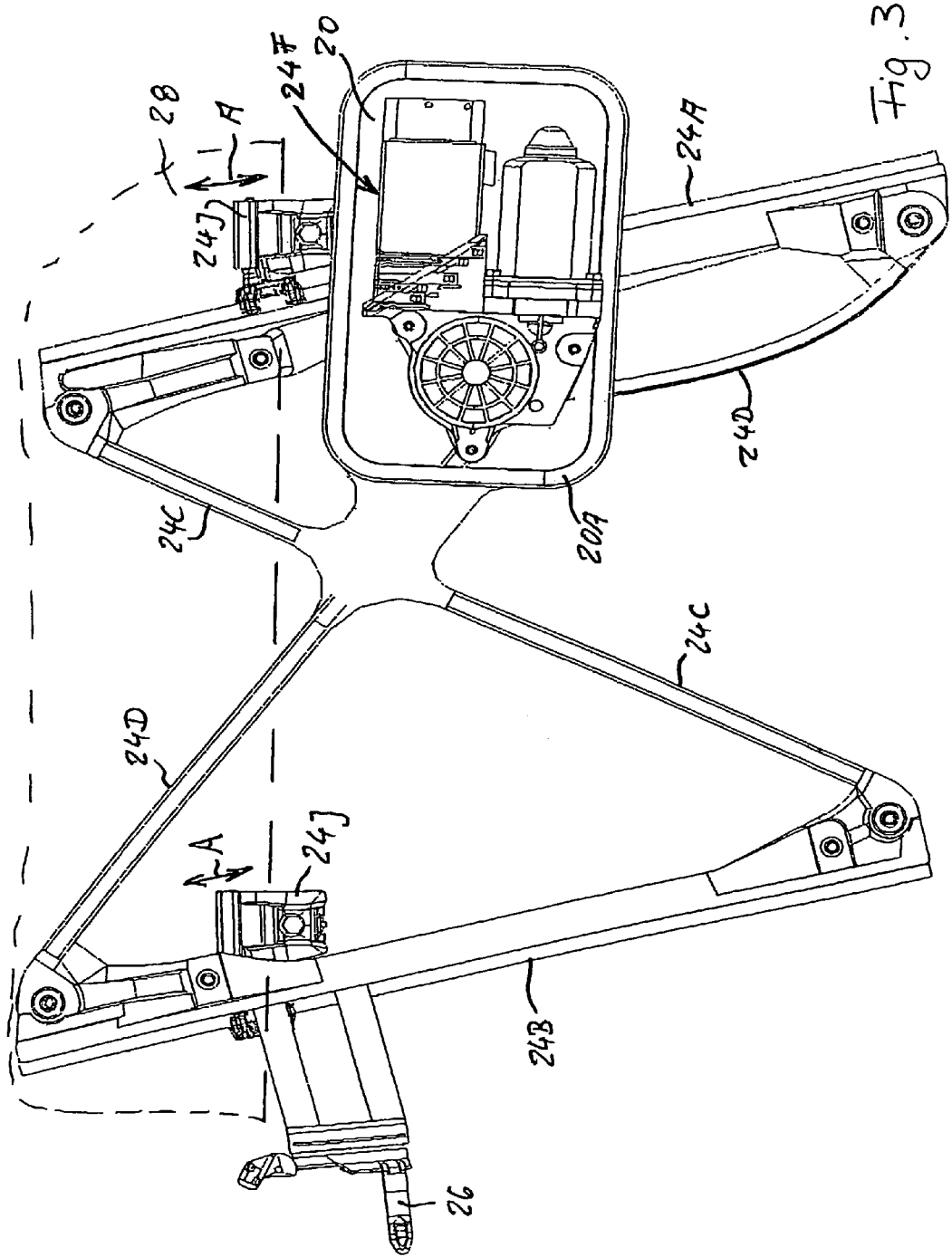
FIG. 3 shows, from the carrier module with window lifter according to FIG. 2, a side view from the opposite side.

As may be deduced from FIGS. 2 and 3, the window lifting arrangement 24 is, of itself, a rigid component, preferably manufactured as a diecast part; deflection pulleys 24G on the four ends of the guide rails serve for a known traction cable 24H. This is installed without Bowden cables and it moves the window pane holder 24J along the double arrows A in the sense of lifting or lowering the window pane 28. Cable guide grooves for protecting the traction cable 24H may be provided on the rigid braces 24D, 24C.

The base plate 20 carries a drive, more specifically, an electric motor 24F on the side toward the vehicle interior and the cable winch 24G on the opposite side, situated on the side of the interior space 16 of the door. Base plate 20 and parts of the window lifter driving mechanism in form of the electric motor 24F and the cable winch 24G constitute a sandwich structure. The afore-mentioned is also valid for the rigid (FIG. 1) or flexible (FIG. 7) connection of the base plate 20 with at least one guide rail 24A of the window lifter arrangement, which simplifies the handling during the assembly of the window lifter and the base plate, respectively. A sealing rotary transmission leadthrough led through the base plate 20, provides for the transmission of rotary force and prevents the passage of dust or moisture from one side to the other of the base plate.

The circumferential flanged mounting edge 20A of the base plate 20 permits a rigid and sealing connecting of the base plate 20 to the interior sheet metal 12 of the door and consequently a closing of the opening 18 provided there, on the sealing edge 18A of the latter.

In the second embodiment according to FIGS. 4-7, the interior sheet metal 12 of the door is connected to the outer sheeting, particularly an exterior door sheet metal, in any optional way, particularly by means of a conventional bead, with the formation of a hollow interior space 16 of the door. In this embodiment, an adequately large access opening 22 to the interior space of the door, through which insertion of a carrier module in the form of a base plate 20 and one functional part of the motor vehicle door is effected, is configured in a known way as a large dimensional opening in the interior sheet metal of the door. The base plate 20, kept comparatively small in cross section in comparison to said access opening, carries, in the embodiment represented in and in this respect preferred, at least one part of a window lifter in the form of the drive—again in a sandwich construction—and one guide rail 24A. The subassembly formed in this way (see also FIG. 7) may be inserted readily through the access opening 22 into the interior space of the door. The guide rail 24A is brought to rest on the surface of the interior sheet metal 12 on the side of the interior space of the door and is connected to the interior door sheet metal, after an adjusting, if applicable, for example, with screws. The base plate 20 reaches its desired position in this way, preferably, under consideration of reference positions of the motor vehicle door. An adequately large access opening to the interior space of the door remains for installing the remaining parts of a window lifter and subsequently for testing the function of the window lifter, even in an installed state. The access opening 22 is closed, entirely at the finish, from the side of the motor vehicle interior, hence, from outside of space 16 by placing a closing plate 30 onto the interior sheet metal 12.

Figure 7A:
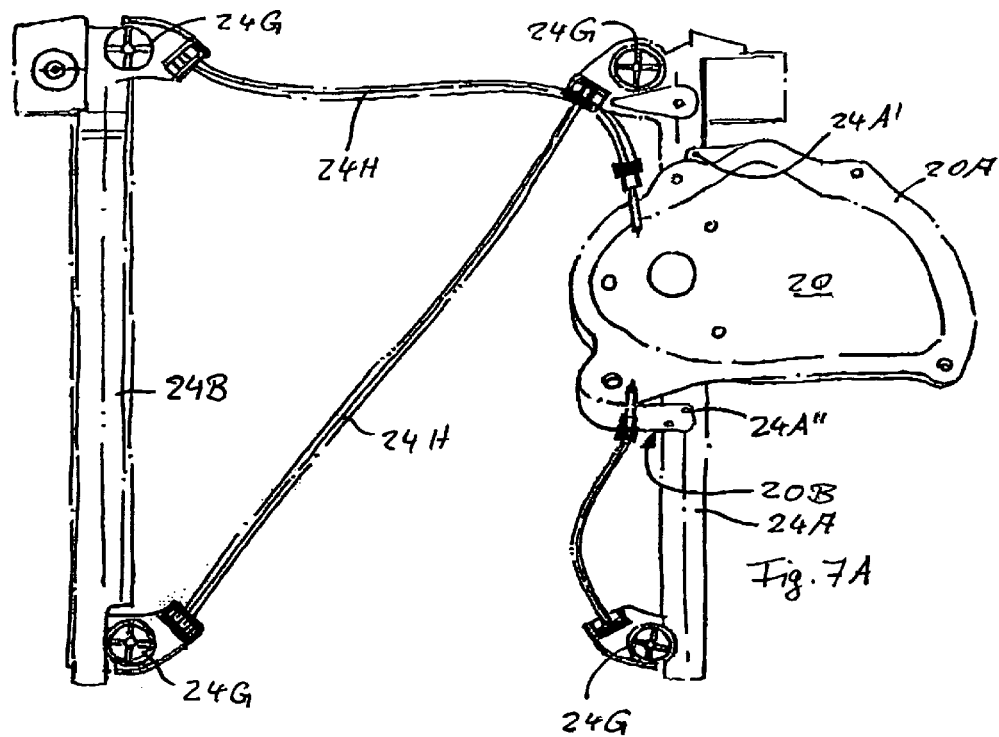
Figure 7B:
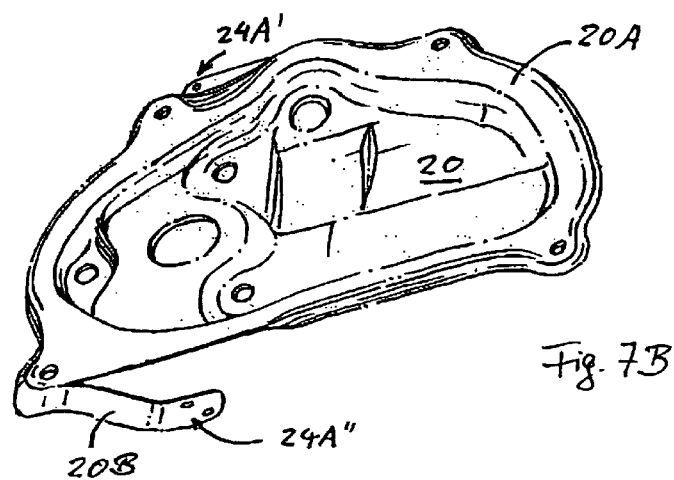
FIG. 7B shows, from the base plate according to FIG. 7A, a side view.

As can be seen from FIGS. 7A and 7B, one guide rail 24A of the window lifting arrangement may be fixed by screws to the base plate 20 at two spaced positions 24A', 24A" of the base plate. Position 24A" being arranged at a flexible arm 20B of the base plate 20 to allow for a position adjustment between base plate 20 and rail 24A. The base plate 20 being supported by the guide rail 24A, which is fixed at its ends to the interior sheet metal 12.

Figure 6:
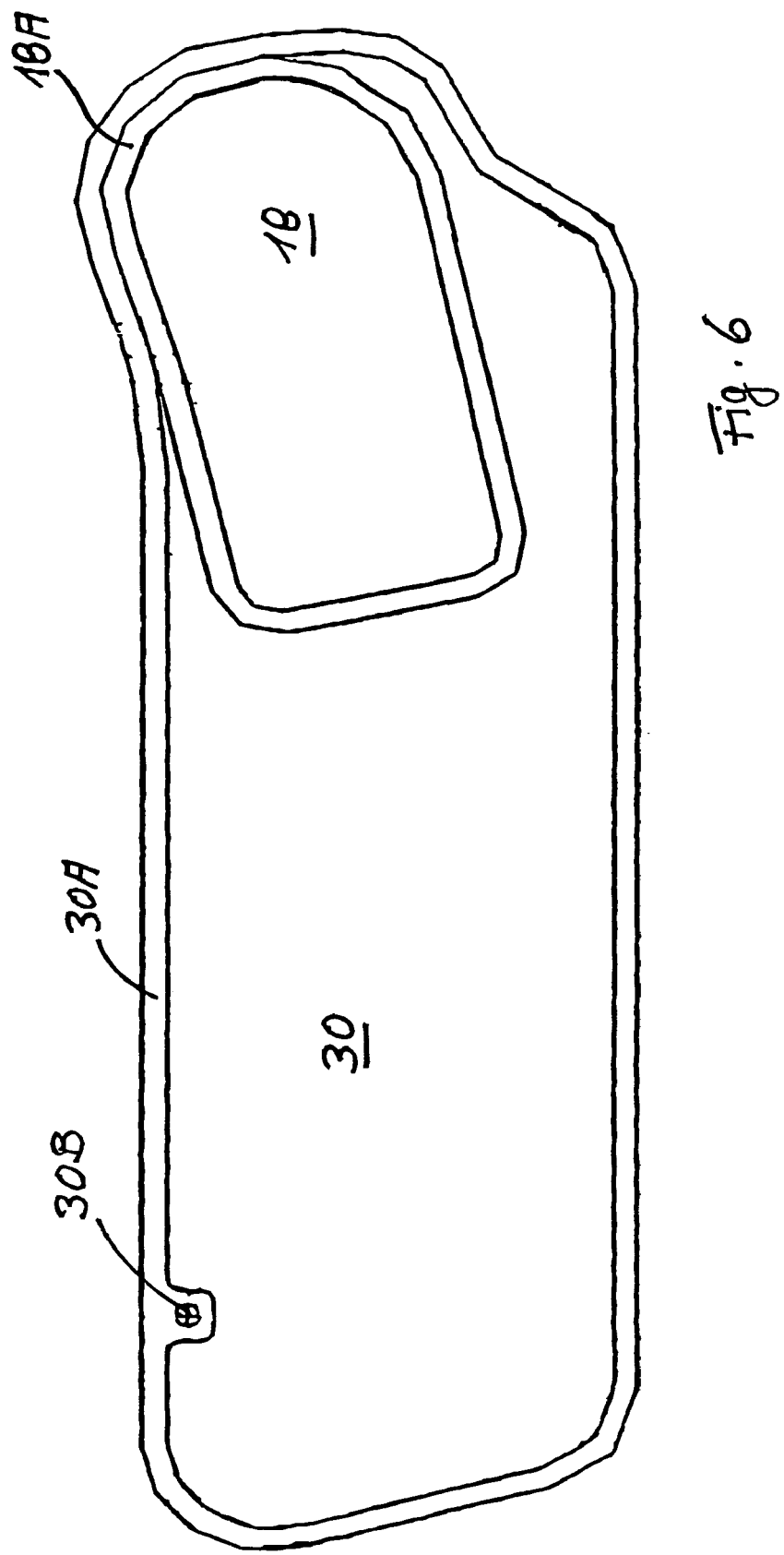
FIG. 6 shows a closing plate for the odor according to FIG. 4.

The closing plate represented in FIG. 6 features a circumferential mounting and sealing edge 30A as well as connecting elements, for example, screw holes 30B. The opening 18, on the sealing edge 18A of which the mounting edge 20A of the base plate 20 comes to rest, is relieved from the closing plate 30.

As already in the first embodiment, the base plate 20 separates the drive into a wet space side and dry space side, with the wet side accepting the driven component and the dry side accepting the driver. Consequently, it is possible, even for a motor vehicle door of a relatively conventional construction, to realize a dry region of the motor vehicle door effectively separated in a sealing way from the wet region. Nonetheless, the assembly and adjusting of functional parts, such as a window lifter, are comparatively simple. In this case, as also in the first embodiment, the window lifter together with the base plate may be subjected to a functional test even without having been installed in the motor vehicle door.

A closing of the interior space 16 of the door, hence, is carried out in the second embodiment by means of a closing plate to be assembled on the inside of the door. This has a primary sealing function and no longer needs to serve as a carrier for diverse components, although this may be useful in principle in an individual case. Consequently, the closing plate must enable an adequate closeness both with respect to the opening for accepting the base plate and also with respect to the adequately large access opening for installation work on the motor vehicle door.

As is evident from FIGS. 5A, 5B and 5C cable ducts 32 may be provided on the edge of the access opening 22 and may be supported against the closing plate 30 in a sealing way, with an intermediate sealing cord 30C if necessary. The connection between base plate 20 and closing plate 30 on one hand (section along Line C-C according to FIG. 4) and between the closing plate 30 and the interior sheet metal 12 of the floor, on the other hand (section along Line B-B according to FIG. 4), may be developed in a similar way with the use of sealing cords and detachable binding screws.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

LIST OF REFERENCE NUMBERS

| | |
|---|---|
| 10 | Motor vehicle door |
| 12 | Interior sheet metal |
| 14 | Exterior sheeting |
| 14A | Stiffening frame |
| 16 | Interior space of the door |
| 18 | Opening |
| 18A | Mounting/sealing edge |
| 20 | Base plate |
| 20A | Mounting/sealing edge |
| 20B | Flexible arm |
| 22 | Access opening |
| 22A | Mounting/sealing edge |
| 24 | Window lifting arrangement |
| 24A | Guide rail |
| 24A' | Fixing position |
| 24A" | Fixing position |
| 24B | Guide rail |
| 24C | Connecting brace |
| 24D | Connecting brace |
| 24E | Cable winch |
| 24F | Window lifter motor |
| 24G | Deflection pulleys |
| 24H | Traction cable |
| 24J | Window pane holder |
| 26 | Lock holder |
| 28 | Window pane |
| 30 | Closing plate |
| 30A | Mounting/sealing edge |
| 30B | Screw holes |
| 30C | Sealing cord |
| 32 | Cable duct |
| A | Double arrow |

What is claimed is:

1. A motor vehicle door comprising:
an interior sheet metal;
an exterior sheeting;
a hollow interior space formed between said exterior sheeting and said interior sheet metal;
an opening in said interior sheet metal;
a carrier module that closes said opening and carries at least one functional part of the motor vehicle door, said carrier module including a base plate which closes said opening from inside said hollow interior space; and
an access opening formed at a free edge of said interior sheet metal sized large enough to allow entry of said carrier module into said hollow interior space.

2. The motor vehicle door as recited in claim 1 wherein said access opening is closed by said exterior sheeting, and said exterior sheeting further includes a carrier frame.

3. The motor vehicle door as recited in claim 1 wherein said at least one functional part is a window lifting assembly including at least one guide rail for a window pane which is lifted and lowered.

4. The motor vehicle door as recited in claim 3 wherein said carrier module carries an additional functional part.

5. The motor vehicle door as recited in claim 1 wherein said at least one functional part is a window lifting arrangement including a pair of guide rails which are rigidly connected for a window pane which is lifted and lowered.

6. The motor vehicle door as recited in claim 5 wherein said window lifting arrangement includes a window driving member.

7. The motor vehicle door as recited in claim 6 wherein said window driving memebr includes at least one connecting brace that accepts a traction cable.

8. The motor vehicle door as recited in claim 7 wherein said at least one connecting brace carries an additional functional part.

9. The motor vehicle door as recited in claim 5 wherein said window lifting arrangement includes a diecast part that functions as a carrying structure.

10. The motor vehicle door as recited in claim 5 wherein said pair of guide rails carries an additional functional part.

11. The motor vehicle door as recited in claim 1 wherein said base plate is received in said opening.

12. The motor vehicle door as recited in claim 1 wherein said free edge of said interior sheet metal is a side edge.

13. The motor vehicle door as recited in claim 1 wherein said interior sheet metal and said exterior sheeting together define the hollow interior space.

14. A motor vehicle door comprising:
an interior sheet metal;
an exterior sheeting;
a hollow interior space formed between said exterior sheeting and said interior sheet metal;
an access opening to said hollow interior space provided in said interior sheet metal;
a closing plate that closes said access opening, said closing plate including an opening; and
a carrier module that carries a window lifting arrangement and closes said opening, said carrier module including a base plate, wherein said access opening is sized large enough to allow entry of said carrier module into said hollow interior space.

15. The motor vehicle door as recited in claim 14 wherein said closing plate closes said access opening from outside said hollow interior space.

16. The motor vehicle door as recited in claim 14 wherein said window lifting arrangement includes a pair of guide rails which are rigidly connected for a window pane which is lifted and lowered.

* * * * *